Feb. 5, 1924.  
D. H. SCHALL  
1,482,816  
BRAKE MECHANISM FOR MOTOR VEHICLES  
Filed Oct. 4, 1922  
4 Sheets-Sheet 1

Witnesses:  
Inventor  
D. H. Schall,  
Attorney

Feb. 5, 1924.

D. H. SCHALL 1,482,816

BRAKE MECHANISM FOR MOTOR VEHICLES

Filed Oct. 4, 1922

Witnesses:

Inventor
D. H. Schall,

By Clarence O'Brien
Attorney

Feb. 5, 1924.                                                    1,482,816
              D. H. SCHALL
         BRAKE MECHANISM FOR MOTOR VEHICLES
               Filed Oct. 4, 1922              4 Sheets-Sheet 4

Witnesses:                                Inventor
                                          D. H. Schall,
                                     By
                                                  Attorney Patented Feb. 5, 1924.

1,482,816

UNITED STATES PATENT OFFICE.

DAVID H. SCHALL, OF CANTON, OHIO.

BRAKE MECHANISM FOR MOTOR VEHICLES.

Application filed October 4, 1922. Serial No. 592,262.

*To all whom it may concern:*

Be it known that I, DAVID H. SCHALL, a citizen of the United States, residing at Canton, in the county of Stark and State of Ohio, have invented new and useful Improvements in Brake Mechanism for Motor Vehicles, of which the following is a specification.

In carrying out the present invention it is my purpose to provide a brake mechanism for motor vehicles which will embody both a service brake and an emergency brake and wherein the brake bands will be so arranged upon the respective drums as to grip the drums evenly and uniformly around the entire circumference of the drum when the bands are contracted or actuated to braking position, thereby insuring a smooth application of the brakes and preventing a locking of the brake bands to the drums and the resultant skidding of the wheels.

It is also my purpose to improve and simplify the general construction of brake mechanism for motor vehicles and to provide a brake mechanism wherein the parts will be readily accessible, so that access may be had thereto for the purposes of replacement and repair.

Furthermore, I aim to provide brake mechanism which will embody comparatively few parts, and these so arranged and correlated as to reduce the possibility of derangement to a minimum.

With the above recited objects in view, and others of a similar nature, the invention resides in the construction, combination and arrangement of parts set forth in and falling within the scope of the appended claims.

Figure 1:
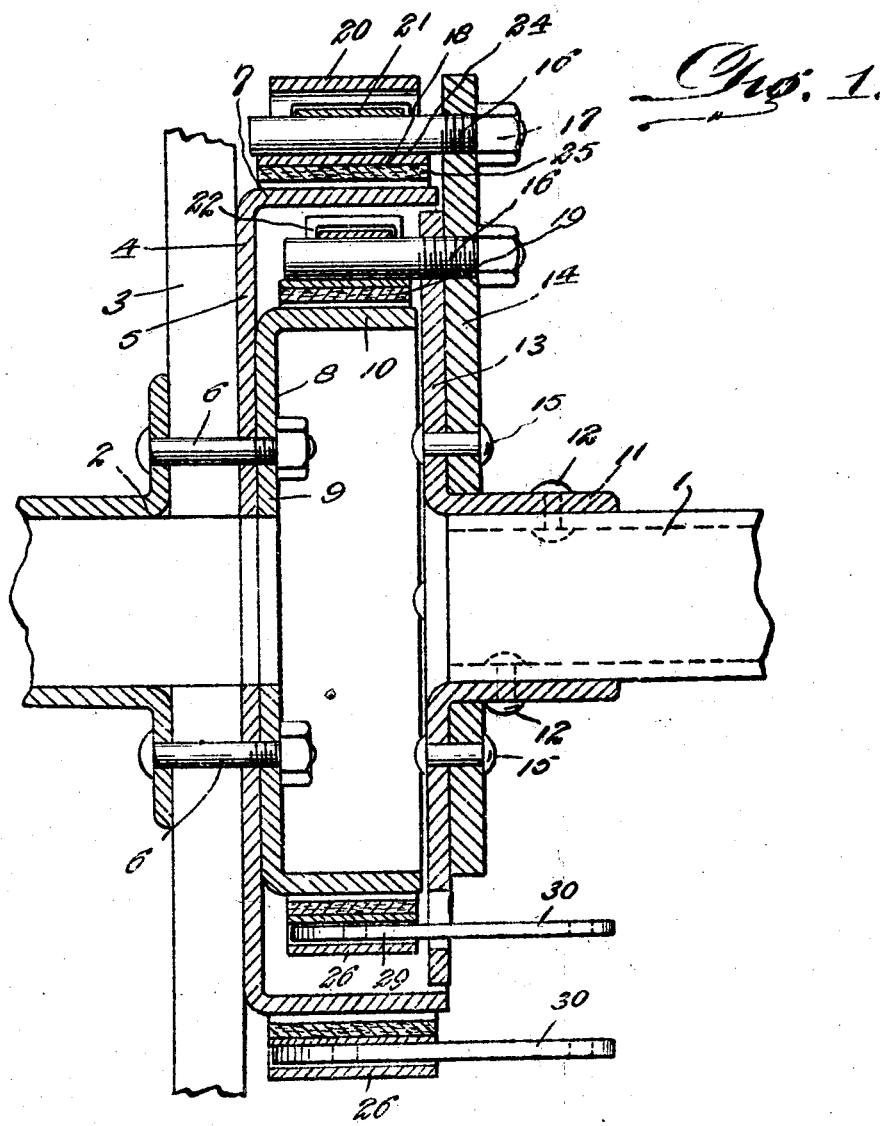
Figure 1 is a transverse sectional view through the brake mechanism constructed in accordance with my invention.

Referring now to the drawings in detail, 1 designates the outer end portion of one end of the rear axle housing of the motor vehicle and 2 the wheel hub journaled upon the outer end portion of the axle housing 1 and equipped with the usual spokes 3 that radiate from the hub and carry the wheel felly.

In accordance with my invention I fix to the inner side of the spokes 3 of the wheel a brake drum 4 that is arranged concentrically of the axis of the wheel. This brake drum 4 embodies a disk-like plate 5 that is fastened to the spokes of the wheel by bolts 6 and has its outer edge formed integral with an annular flange 7 that constitutes the braking element of the drum. Within the drum 4 is a second brake drum 8 arranged concentrically of the axis of the wheel and of the drum 4. This drum 8 comprises a disk-like plate 9 and a braking flange 10 formed integral with the outer edge of the disk 8 and at right angles thereto.

Encircling the axle housing 1 adjacent to the inner side of the wheel and spaced apart a short distance therefrom is a collar 11 that is riveted, as at 12, to the axle housing or otherwise secured thereto and integral with the outer end of the collar 11 is a disk 13 that is arranged concentrically of the axle housing. Secured to the inner side of the disk 13 and spaced apart equal distances around the same are radial arms 14 that are riveted, as at 15, or otherwise secured to the disk 13.

Figure 2:
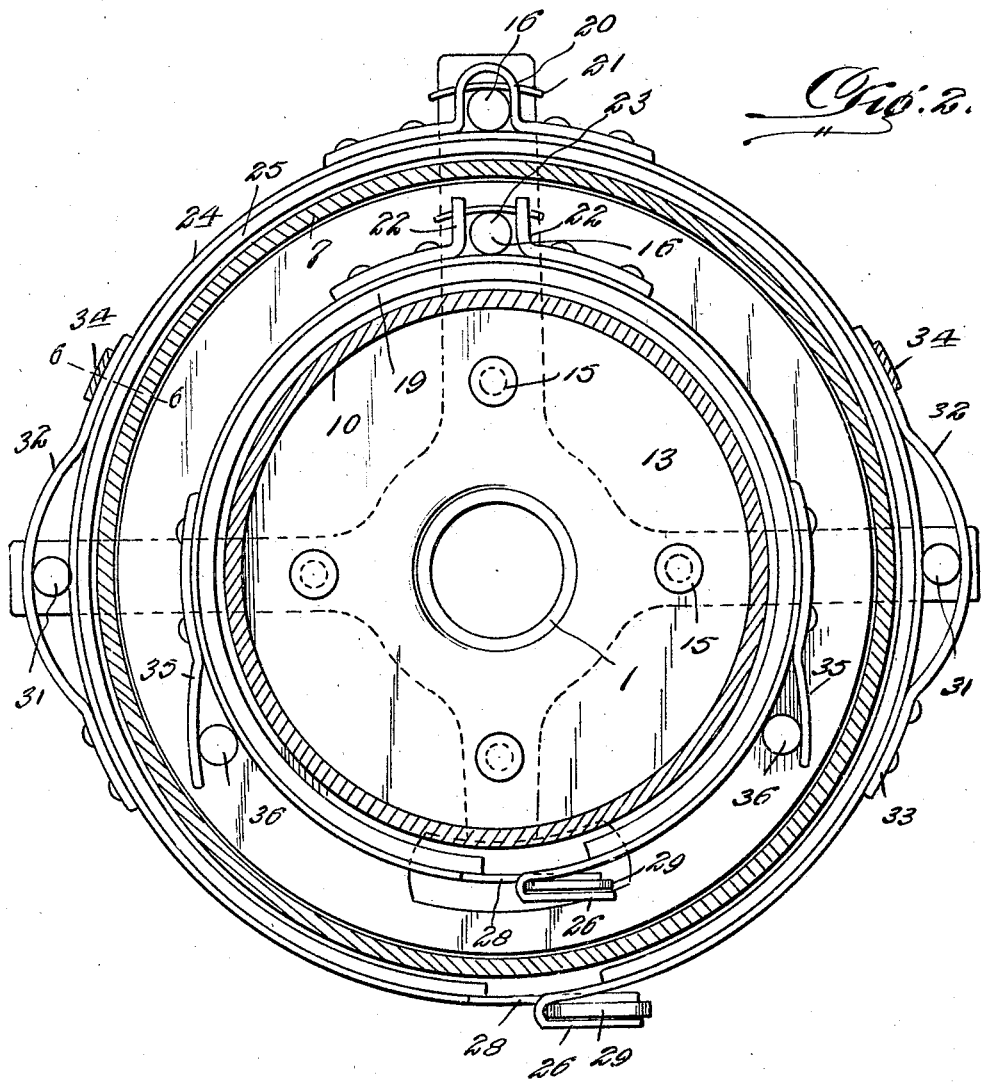
Figure 2 is a view partly in section and partly in elevation.
Figure 3:
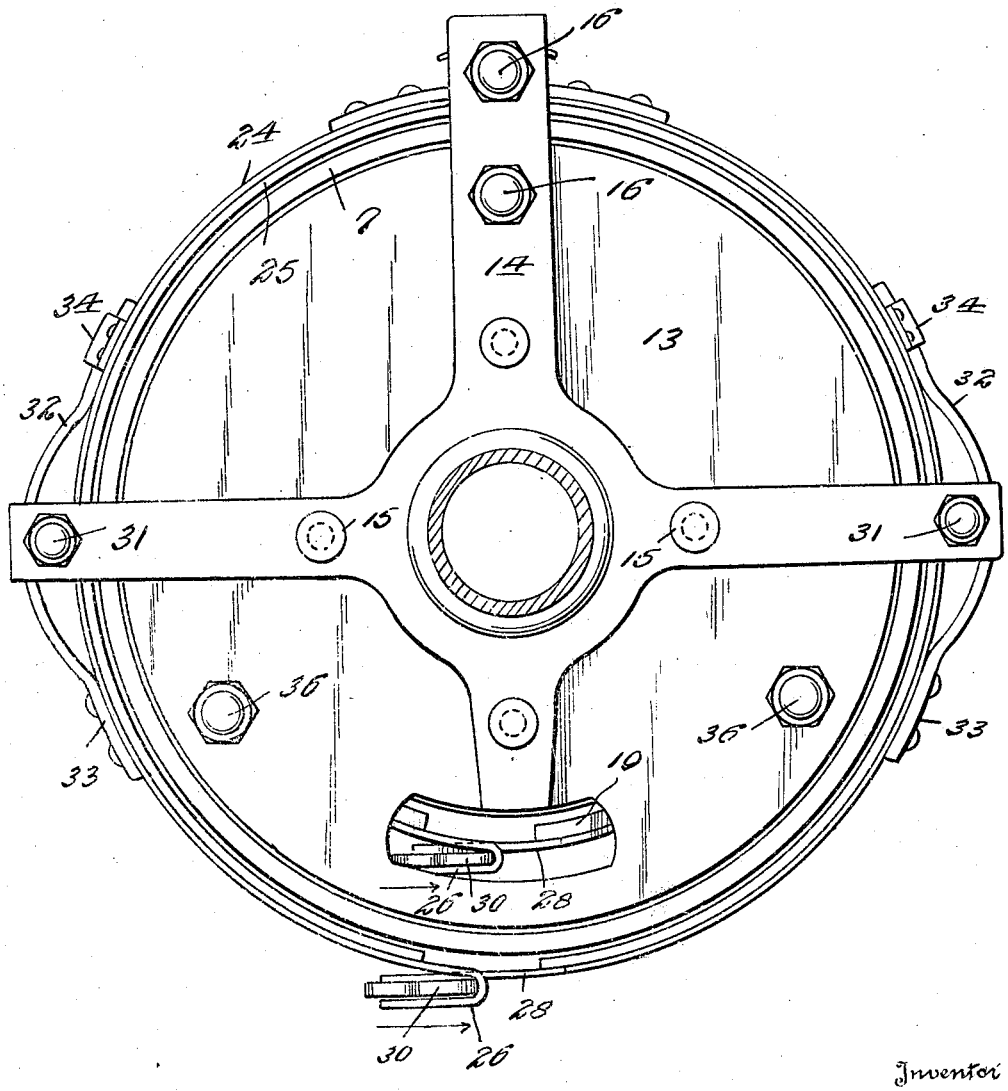
Figure 3 is a view in elevation opposite from Figure 2.

The disk 13 and arms 14 carried by the axle housing are stationary, while the drums 4 and 8 carried by the wheel revolve with such wheel. In the present instance, the arms 14 are four in number, and one projects upwardly, two laterally in relatively opposite directions and one downwardly, as clearly shown in Figures 2 and 3 of the drawings. It is conceivable, however, that the positions of the arms may be changed as desired. The upwardly extending arm 14 adjacent to its upper end is equipped with outwardly extending studs 16, each of which is threaded into the arm, the lowermost one also being threaded into the disk 13, these studs being locked in adjusted positions by nuts 17. These studs 16 overlie the braking flanges of the drums 4 and 8, respectively, as clearly shown in Figure 1 of the drawings. Suspended from the studs 16—16 are brake bands 18 and 19, respectively, that encircle the braking flanges 7 and 10. In the present instance the brake band 18 at its topmost point has riveted thereto a loop 20 that encircles the stud 16 and extending through the legs of the loop 20 is a leaf spring 21 that bears directly upon the pin 16, so as to form yieldable supporting means for the brake band 18. The brake band 19 at its topmost point is equipped with upwardly extending lugs 22 arranged at opposite sides of the stud 16 and through these lugs 22 is passed a leaf spring 23 that supports the brake band 19 yieldingly. The lugs 22 and loop 20 may be used interchangeably or both brake band supports may be alike, if desired.

Each brake band 18—19 is of any suitable or preferred construction, and, as usual, embodies an outer metal band 24 and a brake lining 25 riveted or otherwise secured to the inner side of the metal band.

Figure 4:
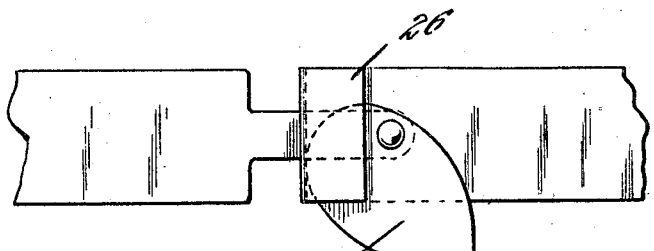
Figures 4 and 5 are detail views of the cam devices for contracting the brake bands.
Figure 5:
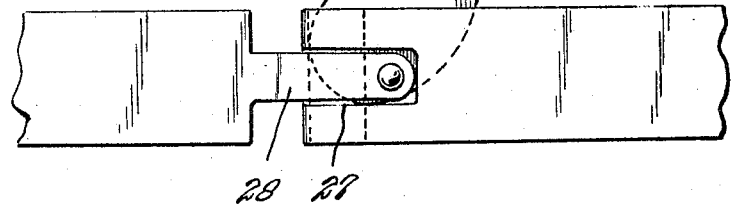
Figure 6:
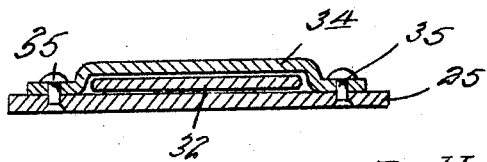
Figure 6 is an enlarged sectional view on the line 6—6 of Figure 2.

As clearly shown in Figures 4 and 5 of the drawings, each brake band 18—19 at its lower portion is split and one end of the split portion is turned upon itself, as at 26, and formed with a slot 27, while the other end of the split portion is formed with a tongue 28 that extends into the slot 27 and lies beneath the downturned portion 26. Pivoted to the inner end of the tongue 28 is a cam 29 equipped with a lever 30. When the cam is in non-braking position, as shown in Figures 4 and 5 of the drawings, the brake bands are expanded, while when the cams are in braking position the bands are contracted, the cams acting against the downturned end portions 26 when being pulled to braking position to contract the bands about the respective drums, so as to bring about a braking action.

In the present instance, the outer ends of the laterally extending arms 14 are equipped with pins 31 that are arranged beyond the outer brake band 18. Over the pins 31 engage leaf springs 32, respectively. One end of each leaf spring is fastened to the brake band, as at 33, while the other end is slidably fitted in a keeper 34 that is fastened to the brake band by rivets 35 or other suitable fastening devices.

The inner brake band 19 is equipped with spring fingers 35 at diametrically opposite points, and these fingers 35 engage pins 36 that are carried by the disk 13. The spring fingers 35 and the leaf springs 32 carried by the respective brake bands act to restore the brake bands to normal or non-braking position when the brake bands are relieved of the action of the cams 29, as is readily apparent from inspection of the drawings.

In practice, the cam lever 30 associated with the brake band 18 is connected to the service brake pedal, while the cam lever 30 of the brake band 19 is connected with the emergency brake lever, so that a service application of the brakes or an emergency application may be made whenever necessary or desired.

From the foregoing description, taken in connection with the accompanying drawings, it will be seen that I have provided a brake mechanism for motor vehicles wherein the emergency brake is entirely separate and independent of the service brake on each rear wheel of the vehicle, and whereby an emergency application or a service application, or both, may be effected quickly, so as to bring the car to a standstill uniformly and without danger of locking the brake bands to the drums.

I have entered into a detailed description of the construction and relative arrangement of parts embraced in the present and preferred embodiment of my invention with a view to imparting a full, clear and exact understanding of the said embodiment. I do not desire, however, to be understood as confining myself to the said specific construction and relative arrangement of parts, inasmuch as in the future practice of my invention such changes or modifications may be made as fairly fall within the scope of my invention as defined by my appended claims.

Having thus described the invention, what is claimed as new, is:—

1. In a brake mechanism of the class described, the combination with the rear axle housing and the ground wheel journaled upon the outer end of said housing, of brake drums secured to the inner side of said ground wheel concentrically of the axis thereof and to each other, brake bands encircling said drums, respectively, means carried by the rear axle housing and supporting said brake bands about said drums, each brake band being split at its lower portion and cam levers connected to the split portions of said brake bands and operable to contract the bands.

2. In a brake mechanism of the class described, the combination with the rear axle housing and the ground wheel journaled upon the outer end of said housing, of brake drums secured to the inner side of said ground wheel concentrically of the axis thereof and to each other, brake bands encircling said drums, respectively, means carried by the rear axle housing and supporting said brake bands about said drums, each brake band being split at its lower portion, cam levers connected to the split portions of said brake bands and operable to contract the bands, and spring elements carried by said brake bands to restore the same to non-braking position subsequent to the action of said cam levers.

3. In a brake mechanism of the class described, the combination with the rear axle housing and the ground wheel journaled upon the outer end of said housing, of brake drums secured to the inner side of said ground wheel concentrically of the axis thereof and to each other, brake bands encircling said drums, respectively, means carried by the rear axle housing and supporting said brake bands about said drums, the lower portion of each brake band being split and having one end downturned and slotted and the other end formed with a tongue projecting through said slot and a cam pivoted upon the tongue behind said downturned end and operable to contract said band.

In testimony whereof I affix my signature.

DAVID H. SCHALL.